(12) United States Patent
Wolff et al.

(10) Patent No.: US 7,977,264 B2
(45) Date of Patent: Jul. 12, 2011

(54) OPTICAL GLASSES OF THE DENSE BARIUM FLINT POSITION

(75) Inventors: Silke Wolff, Hueckswagen (DE); Ute Woelfel, Mainz-Laubenheim (DE); Gordon Kissl, Heidesheim (DE)

(73) Assignee: Schott AG, Mainz (DE)

( * ) Notice: Subject to any disclaimer, the term of this patent is extended or adjusted under 35 U.S.C. 154(b) by 355 days.

(21) Appl. No.: 12/128,860

(22) Filed: May 29, 2008

(65) Prior Publication Data

US 2008/0300125 A1    Dec. 4, 2008

(30) Foreign Application Priority Data

May 31, 2007  (DE) .................... 10 2007 025 601

(51) Int. Cl.
*C03C 3/064* (2006.01)
*C03C 3/066* (2006.01)
*C03C 3/068* (2006.01)
*C03C 3/097* (2006.01)

(52) U.S. Cl. ............. 501/77; 501/78; 501/79; 501/63
(58) Field of Classification Search ......... 501/63, 501/65, 73, 77, 78, 79
See application file for complete search history.

(56) References Cited

U.S. PATENT DOCUMENTS

| | | | |
|---|---|---|---|
| 5,007,948 A | | 4/1991 | Araujo |
| 5,424,255 A | * | 6/1995 | Kassner ................... 501/13 |
| 6,346,493 B1 | * | 2/2002 | Kniajer et al. ............ 501/17 |
| 6,703,333 B2 | * | 3/2004 | Uehara ..................... 501/77 |
| 6,709,998 B2 | * | 3/2004 | Wolff et al. .............. 501/73 |
| 7,087,542 B2 | * | 8/2006 | Uehara ..................... 501/77 |

FOREIGN PATENT DOCUMENTS

| | | |
|---|---|---|
| DE | 10 2004 003 758 | 8/2005 |
| JP | 52-69915 | 6/1977 |
| JP | 58-120539 | 7/1983 |
| JP | 62012633 | 1/1987 |

* cited by examiner

*Primary Examiner* — Jerry A. Lorengo
*Assistant Examiner* — Noah S Wiese
(74) *Attorney, Agent, or Firm* — Michael J. Striker

(57) ABSTRACT

The optical glasses designated to be used in the areas of imaging, sensors, microscopy, medical technology, digital projection, photolithography, laser technology, wafer/chip technology as well as telecommunications, optical communications engineering and optics/illumination in the automotive sector with a refractive index nd of $1.60 \leq nd \leq 1.72$ and/or an Abbe number vd of $32 \leq vd \leq 45$ and with a Tg of 567° C. to 640° C., pronounced short flint character, good chemical resistance, excellent resistance to crystallization, good solarization stability and the following composition (in % by weight based on oxides):

| | |
|---|---|
| $SiO_2$ | 30-45 |
| $B_2O_3$ | 8-12 |
| $Na_2O$ | 8-15 |
| CaO | 0.1-7 |
| ZnO | $0 \leq 5$ |
| $ZrO_2$ | 10-20 |
| $Nb_2O_5$ | 12-24 |
| $Ta_2O_5$ | $0 \leq 9$ |
| AgO | $0 \leq 5$. |

20 Claims, No Drawings

OPTICAL GLASSES OF THE DENSE BARIUM FLINT POSITION

CROSS-REFERENCE

The invention described and claimed herein below is also described in German Patent Application 10 2007 025 601.0, filed May 31, 2007, in Germany. The aforesaid German Patent Application, whose subject matter is incorporated herein by reference thereto, provides the basis for a claim of priority of invention for the invention claimed herein below under 35 U.S.C. 119(a)-(d).

BACKGROUND OF THE INVENTION

1. The Field of the Invention

The present invention refers to an optical glass, the use of such an optical glass, optical elements or preforms, of such optical elements, a method for the production of the optical elements and optical parts or optical components made of such optical elements.

2. The Description of the Related Art

Conventional optical glasses of the optical position claimed herein (preferably dense barium flint position as well as border regions of the flint, dense flint, light flint and barium flint position) for the application areas of imaging, sensor technology, microscopy, medical technology, digital projection, photolithography, laser technology, wafer/chip technology as well as telecommunications, optical communications engineering and optics/illumination in the sector automotive usually comprise lead oxide (PbO) in order to achieve the desired optical properties, i.e. refractive index of nd between $1.60 \leq nd \leq 1.72$ and/or an Abbe number vd of between $32 \leq vd \leq 45$. Lead oxide is also often used to adjust a pronounced short flint character. This leads to glasses with poor chemical resistance. Further, the component lead oxide is harmful to the environment.

Additionally $As_2O_3$ is often used as a fining agent. In recent years, next to PbO also $As_2O_3$ is regarded harmful to the environment and therefore most suppliers of optical instruments and products tend to use glasses that are free of lead and arsenic oxides. For use in high value products, glasses with increased chemical resistance gain increasing importance.

Known lead free glasses of this optical position are usually based on the use of high amounts of $TiO_2$ in silicious matrix, which on the one hand leads to glasses with a high tendency to crystallize, which can therefore not be subject to secondary hot moulding steps, and on the other hand leads to glasses, which are to difficult to handle in mechanical further processing steps, because of their increased hardness.

In optical systems of high quality the correction of colour aberrations is an important issue already during system design. For excellent correction of colour aberration glasses with pronounced short flint character are needed. Those are glasses with a relative partial dispersion significantly deviating from the normal line and, thus, are especially suited for correction of colour aberration. However, this property is often achieved by application of PbO, which should not be used according to the above-mentioned ecological concerns.

Instead of conventional detaching of optical components from block or ingot glass production methods are becoming more and more important, in which optical components are obtained by precise pressing, i.e. directly pressing optical components and/or near-netshape preforms for secondary moulding processes—so-called precision gobs—after melting the glass. This is true for the consumer market as well as for the high quality market. "Precision gobs" are usually and preferably understood to be fire-polished, free or semi-free moulded glass portions obtainable by different production processes.

The above-described is the reason for a strong demand for "short" glasses in process engineering, melting and hot moulding. Glasses are considered "short", if their viscosity very strongly changes with temperature. This behaviour offers the advantage of reproduced duration of hot moulding processes and, thus, reducing the moulding duration in near-netshape precision moulding. Thereby on the one hand the throughput and the efficiency are increased and on the other hand the material of the moulding tools is preserved. This has strong positive impact on the overall production costs. Furthermore, the quick solidification of short glasses allows for the processing of glasses with stronger crystallization tendencies and the formation of seed crystals, leading to problems in secondary moulding steps, is avoided or at least strongly decreased.

Based on the same considerations, there is a need for glasses, the temperature viscosity profile of which shows—absolute—low temperatures during hot moulding. This additionally contributes to decreased process temperatures and thereby allows for improved unit lifetime and by quicker tension-less cooling contributes to reduced formation of seed crystals. Additionally, these glasses provide for an important broader range of possible, probably more cost-effective moulding tool materials, which is particularly important in near-netshape precise pressing.

In modern high performance optics, higher requirements have to be met as to the imaging precision and resolution. That means that on the one hand growing imaging and projection areas have to be obtained and on the other hand the structures to be imaged become smaller and have to be depicted even more precisely and detailed. Thus, it is necessary to irradiate with light of shorter wavelength, i.e. with higher energy, which increases the energy-based load of the optical elements. Additionally, in order to increase production speed, shorter light exposure is aimed at in a multitude of technical applications, like for example microlithography, thus leading to higher radiation power and density, being transmitted through the optical system, thereby necessarily increasing the radiation load per time. Still further in optical systems, especially in telecommunications and communications engineering a high light efficiency, i.e. a high transmission, is needed.

This is not only a challenge to optical system design, but also to the development of optical glass for such optical applications. For example it is known that application of higher radiation densities leads to a phenomenon known as solarization, i.e. a radiation mediated change in structure within the glass, further leading to a strong decrease in transmission, i.e. permeation of light through the glass, of an optical element. Therefore, glasses are needed that show strong resistance against the solarization phenomenon.

The following documents concern glasses according to the state of the art:

JP 87-012633A (Hoya)
JP 77-069915A (Hoya)
JP 58-120539A (Ohara)
U.S. Pat. No. 5,007,948 (Corning)

According to these documents there are glasses obtainable that have similar optical positions and chemical compositions, but these show significant disadvantages when compared to the glasses according to the present invention.

The glasses disclosed in the laid-open patent application JP 87-012633A comprise significant amounts of more than 13 mol % $Cs_2O$, which is very expensive in highly pure qualities.

On the one hand this oxide serves as an adjusting agent for a refractive index gradient in interaction with the exchange partner ZnO, on the other hand the high amount of flux melting agent weakens the matrix in order to increase ion mobility such that a meaningful exchange followed by accelerated and effective relaxation can take place in order to avoid tension within the material.

According to this document, furthermore lower positions in terms of refractive indices are aimed at; therefore proportions of $ZrO_2$ and $Nb_2O_5$ are present only optionally and in small amounts ($ZrO_2$ smaller than <4 mol %; $Nb_2O_5$ smaller than 1 mol %).

Because of similar reasons, the glasses disclosed in JP 77-069915A show corresponding disadvantages: due to the small amounts of $ZrO_2$, the desired optical position especially a high dispersion of vd≧32 cannot be achieved. The high amounts of CaO especially in combination with high possible amounts of other alkaline earth metal oxides serve as matrix modifier and, thus, act as destabilizers and promoters of crystallization towards the glasses.

JP 58120539 discloses glasses with high contents of silicon dioxide, all of which glasses comprise the expensive component lithium oxide, while boron oxide is optionally present. By application of the already more expensive lithium oxide, the possible application of boron oxide as matrix stabilizer is strongly limited, as the combined presence of both components, boron and lithium oxide, exerts synergistic attack on the fire proof material.

The glasses disclosed in U.S. Pat. No. 5,007,948 comprise relevant proportions of silver for adjusting a refractive index gradient. Thereby the glasses not only become uneconomical, they also are redox-sensitive during hot moulding. They thus loose their workability as far as secondary moulding steps are concerned, like for example re-pressing, precise pressing of lenses and similar. Also actions, such as tension and target cooling processes, as usually applied to classical optical glasses, leads to undesirable properties. Furthermore, the basic glasses according to this document even before ion exchange comprise large amounts of $Al_2O_3$ that facilitates ion exchange. By this additional amount of high melting components (up to 32 cation mol %) the glasses become difficult-to-melt and thereby even less economical on the one hand and on the other hand show loss of transmission at the blue spectral edge because of the higher melting temperatures leading to impurities from platinum crucible material. As a possibility for compensation of these disadvantages, large amounts of alkaline metal oxides $Na_2O$ are added, up to 39 cation mol %, i.e. a flux melting agent. Thereby a structure in the material is obtained that is facilitating ion exchange but is detrimental as to the stability towards crystallization, which is not desirable.

SUMMARY OF THE INVENTION

It is the object of the present invention to provide optical glasses in a composition range with which the desired optical properties can be achieved, while based on ecological considerations no PbO and if possible neither $As_2O_3$, $Bi_2O_3$ and $Li_2O$, and preferably neither $TiO_2$, is applied. Simultaneously, the glasses should show exceptional resistance to solarization while having pronounced short flint characteristics. These glasses shall preferably be processable by precise pressing techniques and show low glass transition temperatures Tg. Further, they should be easily meltable and processable, as well as they should be sufficiently resistant to crystallization, thus rendering production in continuously run assembly possible. Further a glass is desirable that is relatively short in a viscosity range of from $10^{7.6}$ to $10^{13}$ dPas.

These glasses shall be suitable for applications in the field of imaging, sensors, microscopy, medical technology, digital projection, photolithography, laser technology, wafer/chip technology as well as telecommunications, optical communications engineering and optics/illumination in the automotive sector.

Within the glasses according to the present invention application of expensive and matrix-weakening components should be substituted by cost-effective and crystallization-stable material.

The above-described problem is solved by the embodiments of the present invention as set out in the claims.

Especially an optical glass is provided, comprising the following components (in weight % based on the oxides):

| | |
|---|---|
| $SiO_2$ | 30-45 |
| $B_2O_3$ | 8-12 |
| $Al_2O_3 + GeO_2$ | $0 \leq 5$ |
| $Na_2O$ | 8-15 |
| $K_2O$ | $0 \leq 5$ |
| $\Sigma M_2O$ (Na, K) | $8 \leq 18$ |
| CaO | 0.1-7 |
| ZnO | $0 \leq 5$ |
| MgO, SrO, BaO | je $\leq 5$ |
| $\Sigma$ MO (Mg, Ca, Sr, Ba, Zn) | $0 \leq 17$ |
| $La_2O_3$ | $0 \leq 7$ |
| $ZrO_2$ | 10-20 |
| $Nb_2O_5$ | 12-24 |
| $Ta_2O_5$ | $0 \leq 9$ |
| $\Sigma$ oxides (La, Nb, Ta, Zr) | $22 \leq 45$ |
| $\Sigma$ oxides (Y, Gd, Yb, W, P) + F | $0 \leq 5$ |
| AgO | $0 \leq 5$ |

The glasses according to the present invention have the optical position in common with known glasses of this optical position. However, they show pronounced short flint character, better chemical resistance and processability, low production costs through reduced raw material and process expenses, sufficient resistance to crystallization due to their short character, good stability towards solarization as well as good environmental friendliness and good meltability and processability. By the glasses according to the present invention such an adjustment of stability towards crystallization and viscosity temperature profile was invented that a further thermic processing (for example pressing or re-pressing) of the glasses is possible.

The glasses according to the present invention preferably have a refractive index nd of $1.60 \leq nd \leq 1.72$ and/or an Abbe number vd of $32 \leq vd \leq 45$, but a refractive index of $1.62 \leq nd \leq 1.70$ and/or an Abbe number of $35 \leq vd \leq 43$ are more preferred. However a refractive index of $1.63 \leq nd \leq 1.68$ and/or an Abbe number of $37 \leq vd \leq 43$ are even more preferred.

According to an embodiment the glasses according to the present invention are as short as possible within a viscosity range of from $10^{7.6}$ to $10^{13}$ dPas. "Short glasses" in the sense of this description are glasses, the viscosity of which varies strongly with a rather small change in temperature within a certain viscosity range. Preferably the temperature interval is $\Delta T$, in which the viscosity of this glass decreases from $10^{7.6}$ to $10^{13}$ dPas, is up to 150 K, more preferably up to 100 K.

In the following the expression "x-free" or "free of component x" means that the component x is essentially not present within the glass, i.e. the component addressed is present only as an impurity, if at all. But it is not added to the composition as a desired component. X in this context means any component like for example $Li_2O$.

The basic glass system is a niobium silicon system, wherein the $Nb_2O_5$ is embedded into the silicon framework, which comprises small amounts of $B_2O_3$, and is present for adjustment of the claimed optical position. For this purpose 12 to 24% by weight, preferably 13 to 20% by weight, further preferred 14 to 18% by weight of $Nb_2O_5$ are present within the composition. With lesser amounts the desired optical position (moderate refractive index and Abbe number) could not be achieved. Higher proportions would raise the dispersion expressed in $P_{g,F}$ and thus increase the aberration from the normal line of dispersion and thus would impair the short flint character of the glasses. Since, based on these considerations, for adjustment of the relative anomalous partial dispersion further components would have to be added (preferably $ZrO_2$ and $Ta_2O_5$), a higher amount of $Nb_2O_5$ would additionally lead to an undesirable shift of optical position and furthermore would lead to crystallization-prone glasses because of the seed crystal forming character of $Nb_2O_5$ in combination with $ZrO_2$ and $Ta_2O_5$. These glasses would have a very narrow process latitude this indicates for low yields in production and secondary hot moulding steps.

The silica based matrix, into which the $Nb_2O_5$ is incorporated, is based on 30 to 45% by weight, preferably 33 to 42% by weight, more preferred 36 to 40% by weight $SiO_2$. Smaller amounts of $SiO_2$ would lead to an unstable matrix and thus to devitrification or at least glasses that are prone to crystallization. Higher amounts of $SiO_2$ would lead to "long" glasses, i.e. to glasses, the viscosity of which is poorly altered with increased or lowered temperature. Furthermore, glasses containing high amounts of $SiO_2$ are often high melting point glasses. These two properties are not suitable for glasses that are supposed to be processed in near-netshape hot moulding processes.

This is the reason why the matrix, which has been destabilized by high amounts of substances with high refractive indices, is supported by a second matrixbuilding component $B_2O_3$, which component does, due to its properties similar to a flux melt agent, not lead to "long" glasses nor to high melting point glasses. $B_2O_3$ is present in amounts of from 8 to 12% by weight, preferably at least 9% by weight. Smaller amounts do not show the required stabilizing effect at the desired quite high $SiO_2$ proportions; higher amounts, however, may lead to increased crystallization tendency in the glasses according to the present invention, because they increase ion mobility. Additionally, high amounts of boron outside the above-indicated range increase aggressiveness of the melt towards the refractive material.

Further stabilization against crystallization can be achieved by optionally adding the matrix-builder $GeO_2$ in amounts of up to 5% by weight. Therein 5% by weight should however not be exceeded, in order to avoid "long" high melting point glasses.

According to most embodiments, the glass according to the present invention does not comprise any aluminium oxide as further matrix-builder. According to a certain embodiment of the present invention, the glass is however suitable for ion exchange processes. According to this embodiment, it is preferred that the glasses comprise $Al_2O_3$. A small amount of $Al_2O_3$ of up to 5% by weight supports formation of a structure in the material, which structure further supports ion exchange by increasing ion mobility. An increase of $Al_2O_3$ content above 5% by weight would, however, lead to increased devitrification tendencies and to "long" glasses so that this is not preferred. A glass according to this embodiment can comprise silver oxide in a proportion of 5% by weight, preferably 2% by weight, too. An increase of silver oxide content above 5% by weight would however lead to impaired transmission of the glass.

The sum of additional matrix-builders like $Al_2O_3$ and/or $GeO_2$ should not exceed 5% by weight.

According to the present invention, the terms "up to" or "not exceeding" in context with indication of an amount of a component present in the glass mean that these components can be present up to the indicated amount but also in smaller proportions (mathematical symbol $\leq$).

Next to $Nb_2O_5$, also the high refractive index component $ZrO_2$ is added to the glass composition according to the present invention in amounts of 10 to 20% by weight, preferably at least 11% by weight and further preferred at least 12% by weight, even further preferred 14% by weight. The upper limit for $ZrO_2$ is 19% by weight, further preferred 18% by weight. The person skilled in the art will freely chose a suitable range based on the above-mentioned upper and lower limits, which is true for all components of the glasses according to the present invention discussed in this description.

$Ta_2O_5$, is added in amounts of up to 9% by weight, preferably up to 7% by weight and further preferred up to 5% by weight. As a lower limit 0.5% by weight are preferred, additionally 0.1% by weight can be added for adjustment of the optical position.

Some embodiments of the glasses according to the present invention can, however, be free of tantalum oxide. In other respects the qualified choice of tantalum oxide allows for application of the low amounts of $Nb_2O_5$ in the present invention, the excession of which would lead to an increased tendency towards crystallization of the glasses. Furthermore, both components, in contrast to $Nb_2O_5$, free of intrinsic absorptions at the blue spectral edge of optical glasses, which leads to the consequence that the distribution of the required amounts of high refractive index components in favour of $ZrO_2$ and $Ta_2O_5$ yields glasses with improved transmission when compared to glasses with higher amounts of $Nb_2O_5$. Additionally, $ZrO_2$ and especially $Ta_2O_5$, in contrast to $Nb_2O_5$, support a wavelength dependant refractive index run (dispersion) leading to pronounced short flint character of the glass.

Because of the crystallization seed forming character of the components $Nb_2O_5$, $ZrO_2$ and $Ta_2O_5$, the sum of their amounts present in the composition should not exceed 45% by weight, preferably not exceed 42% by weight.

$TiO_2$ increases refractive index and has crystallization seed forming properties, too, while simultaneously impairing transmission at the blue spectral edge. Thus, preferred embodiments of the glasses according to the present invention are free of this component ($TiO_2$-free).

Special embodiments of the glasses according to the present invention may, however, comprise $TiO_2$ in an amount of 0.1 to 2% by weight, preferably up to 0.5% by weight, further preferred un to 0.45% by weight. Addition of $TiO_2$ may be required, in order to stabilize the glass against long term radiation damage, i.e. solarization.

$Na_2O$ is added in an amount of 8 to 15% by weight, preferably at least 9.5% by weight and/or up to 14% by weight, in order to adjust the desired dispersion characteristics viz. short flint character. Lower proportions, however, would not yield the desired effect.

$Na_2O$ in combination with $K_2O$ (in an amount of up to 5% by weight, preferably up to 3% by weight) serves for flexible fine-tuning of optical position as well as temperature viscosity profile in favour of near-netshape hot moulding. But the sum of the amounts of the alkaline metals $Na_2O$ and $K_2O$ present in the composition should, according to preferred embodiments of the glasses according to the present invention, not exceed 18% by weight, preferably 15% by weight. Higher amounts lead to an unacceptably strong influence in the direction of low refractive indices and/or "long" glasses as well as by increasing ion mobility lead to increased tendency towards crystallization of the glasses according to the present invention. Furthermore, the content of $K_2O$ has to be limited to up to 5% by weight, as it, in contrast to $Na_2O$, negatively influences dispersion characteristics.

Additionally, $Na_2O$ as relatively small alkaline metal oxide and with its properties to act as a flux melt agent is predetermined for purpose-dependent nonstandard adjustments, like for example ion exchange ability, which is of importance in case $Ag_2O$ is not added or only added in small amounts.

Silver oxide can be present in the glass in amounts of up to 5% by weight, further preferred up to 3% by weight.

Also, $Al_2O_3$ can optionally be present; here, amounts of up to 7% by weight, preferably up to 5% by weight and most preferred up to 3% by weight are possible, which can cause small variations in viscosity temperature profile.

The glasses according to the present invention are, according to preferred embodiments, free of $Li_2O$, as this component, especially in combination with the obligatory $B_2O_3$ amounts in the glasses according to the present invention leads to increased aggressiveness of the melt towards refractory material. This in turn leads to significant entry of refractory material into the glass and bad durability of the unit. As far as platinum is used as refractory material, this leads to loss of transmissivity at the blue spectral edge, and as well as in case ceramic material is used leads increased tendency towards crystallization during the melt as well as during primary and/or secondary hot moulding steps, because of heterogeneous crystallization seeds.

The glasses according to the present invention can comprise components MO selected from the group of alkaline earth metals MgO, CaO, SrO, BaO, ZnO which in sum of their amounts can constitute up to 17% by weight, preferably up to 12% by weight of the composition, in order to fine-tune the viscosity temperature profile. Therein, every one of the components, except CaO, can be present in amounts of up to 5% by weight in the glass according to the present invention.

Alternative embodiments of the present invention are free of MgO, SrO and/or BaO.

CaO is present in amounts of at least 0.1% by weight, preferably 0.5% by weight, further preferred 1% by weight and/or up to 7% by weight, preferably up to 5% by weight and further preferred up to 4% by weight within the glasses according to the present invention.

ZnO is optionally added, but preferably present in amounts of at least 0.1% by weight, further preferred at least 1% by weight and/or up to 5% by weight, preferably up to 4% by weight, in order to stabilize the glass according to the present invention against crystallization.

Excession of the upper limits for the proportions of alkaline earth metal would next to an undesiredly strong feedback to the viscosity temperature profile (too short glasses) lead to a significant decrease in refractive index and increased Abbe number, thus, leading away from the desired optical position. Additionally, MgO and SrO are components, the raw material of which are difficult to purchase in the qualities needed for high performance optics, and thus are more cost-intensive than other alkaline earth metal oxides. Abandoning other members of the components MO, i.e. focussing on one of the components CaO or ZnO, would limit variability of the viscosity temperature profile, like an undercut of the indicated lower limits would have negative impact.

Additionally, application of CaO is obligatory, as CaO has strong positive influence on the desired dispersion characteristics (short flint). BaO on the other hand acts significantly weaker in this direction, while ZnO contravenes short flint character. Thus, the amounts of these two components are restricted to their upper limits.

For more flexible adjustment of a special point within the achievable area of optical positions, the glasses according to the present invention can further comprise oxides of the group $P_2O_5$, $Y_2O_3$, $Gd_2O_3$, $Yb_2O_5$, $WO_3$ or F in a total amount of up to 5% by weight. An increase of the cumulated amount of F, $P_2O_5$, $Y_2O_3$, $Gd_2O_3$, $Yb_2O_5$, $WO_3$ above 5% by weight would next to impaired trans-mission (by $Y_2O_3$, $Gd_2O_3$, $Yb_2O_5$, $WO_3$) lead to increased tendency towards devitrification (by $Y_2O_3$, $Gd_2O_3$, $Yb_2O_5$) and/or lead to handling and safety problems in batch preparation and melting (by F, $P_2O_5$).

The glass according to the present invention comprises an optional proportion of $La_2O_3$ (up to 7% by weight, preferably 5% by weight, further preferred up to 3% by weight). Lanthanum oxide, in contrast to niobium oxide, lowers dispersion and can thus contribute to achievement of short flint character. However, it possesses an intrinsic absorption in the blue spectral range and, thus, shifts the transmission edge (wavelength of 50% transmission) of $La_2O_3$-containing glasses significantly towards longer wavelengths. Furthermore, lanthanum oxide significantly increases the tendency towards crystallization of optical glasses. Hence, the proportion shall, especially in addition to the other high refractive index components, not exceed the indicated upper limit (sum [$Ta_2O_5$, $ZrO_2$, $Nb_2O_5$, $La_2O_3$] preferably up to 45% by weight, further preferred 42% by weight), whereas preferred embodiments are even free of $La_2O_3$.

Based on the same reasons, the glasses according to the present invention are preferably free of $Bi_2O_3$, which can additionally lead to significant colorations within the glass, because of its sensitivity to redox-conditions in the melt. The process latitude of such glasses are extremely narrow and, thus, are uneconomical for classical optical glasses.

The glass according to the present invention as an optical glass is preferably free of colouring and/or optically active, like laser-active components. According to an alternative embodiment of the present invention, namely as far as the glass is used as a base glass for an optical filter or solid state laser, the glass may comprise colouring and/or optically active like laser-active components in amounts of up to 5% by weight, wherein these amounts are added to the other components already constituting 100% by weight (resulting in a relative shift of the proportions of the other components).

According to an embodiment of the present invention, the glass according to the present invention preferably consists of the mentioned components, preferably the above-mentioned components, to an extent of at least 90% by weight, preferably to an extent of at least 95% by weight.

According to a further embodiment of the present invention the glass according to the present invention is preferably free of other components not indicated above, i.e. according to such an embodiment, the glass essentially consists of the components mentioned above. For definition of the term "free of component x" see above.

The glass according to the present invention can comprise usual refining agents in small amounts. Preferably, the sum of refining agents added to the composition is up to 2.0% by weight, further preferred up to 1.0% by weight, wherein these amounts are added to the other components constituting 100% by weight of the composition. As refining agents within the glass according to the present invention at least one of the following components can be present (in % by weight added to the rest of the glass composition):

|        |       |        |
|--------|-------|--------|
| $Sb_2O_3$ | 0-1   | and/or |
| SnO    | 0-1   | and/or |
| $SO_4^{2-}$ | 0-1   | and/or |
| NaCl   | 0-1   | and/or |
| $As_2O_3$ | 0-0.1 | and/or |
| $F^-$  | 0-1   |        |

All glasses according to the present invention show good chemical resistance and stability towards crystallization. They further distinguish themselves by good meltability and flexible near-netshape processability, low production costs by reduced process expenses, good ion exchange properties, good stability towards solarization as well as environmental friendliness.

The glasses according to the present invention have glass transition temperatures Tg of less or equal to 640° C., are resistant to crystallization and are readily processable.

The glasses according to the present invention show negative anomalous relative partial dispersions of up to $-25*10^{-4}$ in measurement specimen taken from coolings with cooling rates of about 7 K/h.

The glasses according to the present invention show thermal coefficients of expansion a of less than $10*10^{-7}$/K. Thereby problems related to thermal tension in further processing and joining technology are avoided.

The glasses according to the present invention show specific densities of less or equal to 3.4 g/cm³. Thus, the optical elements and/or components obtained from these glasses are readily usable for mobile/movable parts, as they have relatively low inert mass when compared to similar lead-containing glasses.

By the glasses according to the present invention such an adjustment of optical position, viscosity temperature profile and processing temperatures was achieved that highly specified, near-netshape hot moulding is even possible with sensitive high-precision machinery. Additionally, a correlation of crystallization stability and viscosity temperature profile was realized that further thermal processing like pressing or re-pressing or ion exchange processes of the glasses is possible offhand.

The present invention further relates to the use of the glasses according to the present invention in the fields of imaging, sensors, microscopy, medical technology, digital projection, telecommunications, optical communications engineering/transmission of information, optics/illumination in the automotive sector, photolithography, stepper, excimerlaser, wafer, computerchips as well as integrated circuits and electronic devices comprising such circuits or chips.

The present invention further relates to optical elements comprising the glass according to the present invention. Optical elements can especially be lenses, prisms, light leading rods, arrays, optical fibres, gradient components, optical windows and compact components. The term "optical element" according to the present invention also comprises pre-forms of such an optical element like for example gobs, precision gobs and the like.

Further, the invention refers to a process for the production of optical elements comprising the step:
  precise pressing of the optical glass according to the present invention.

Furthermore, the present invention relates to the use of such optical elements for the production of optical components or parts designated to be used for example in the areas of sensors, microscopy, medical technology, digital projection, telecommunications, optical communications engineering/transmission of information, optics/illumination in the automotive sector, photolithographie, stepper, excimerlaser, wafer, computerchips, as well as integrated circuits and electronic devices comprising such circuits or chips.

Further, the present invention refers to optical parts or optical components comprising aforementioned optical elements and designated to be used in the areas of imaging, sensors, microscopy, medical technology, digital projection, telecommunications, optical communications engineering/transmission of information, optics/illumination in the automotive sector, photolithographie, stepper, excimerlaser, wafer, computerchips, as well as integrated circuits and electronic devices comprising such circuits or chips.

EXAMPLES

The tables 2 and 3 show 12 examples for preferred composition ranges. The glasses described in these examples have been produced as follows:

The raw material for the oxides, preferably the corresponding carbonates weight, one or more refining agents like for example $Sb_2O_3$ were added and blended well. The batch was molten at 1250° C. in a discontinuously run melting unit, subsequently refined (1350° C.) and homogenized. The glass can be cast at a casting temperature of about 900° C. and processed to the desired shape. In a high-volume continuously run melting unit temperatures can be reduced by at least 100 K and the material can be processed in a near-netshape hot moulding process, for example, precise pressing.

TABLE 1

Melting example for 100 kg calculated glass:

| oxide | wt. % | raw material | amount (kg) |
|-------|-------|--------------|-------------|
| $SiO_2$ | 38 | $SiO_2$ | 38.08 |
| $B_2O_3$ | 11 | $H_3BO_3$ | 19.41 |
| $Na_2O$ | 11.5 | $Na_2CO_3$ | 19.17 |
|       |       | $NaNO_3$ | 1.37 |
| CaO | 2.5 | $CaCO_3$ | 4.75 |
| ZnO | 2 | ZnO | 1.99 |
| $ZrO_2$ | 16 | $ZrO_2$ | 15.70 |
| $Nb_2O_5$ | 16 | $Nb_2O_5$ | 16.07 |
| $Ta_2O_5$ | 3 | $Ta_2O_5$ | 2.76 |
| $Sb_2O_3$ | 0.2 | $Sb_2O_3$ | 0.20 |
| sum | 100.2 |  | 119.50 |

The properties of the obtained glass are indicated in table 2 as example 1. Next to the measurement results described there, the glass shows excellent chemical resistance, characterized by AR=1.0 and SR=1.0.

TABLE 2

Melting examples in % by weight

| | examples | | | | | |
|---|---|---|---|---|---|---|
| | 1 | 2 | 3 | 4 | 5 | 6 |
| $SiO_2$ | 38 | 37 | 32 | 33 | 37 | 40 |
| $B_2O_3$ | 11 | 10.5 | 11 | 12 | 11 | 10 |
| $Al_2O_3$ | | | | | | |
| $Na_2O$ | 11.5 | 10 | 15 | 10 | 8 | 12 |
| $K_2O$ | | | 5 | | 3 | 2 |
| MgO | | | | | | |
| CaO | 2.5 | 3 | 3 | 4 | 1 | 2 |
| BaO | | | | 4 | | |
| SrO | | | | 2 | | |
| ZnO | 2 | | 3 | 5 | 3 | |
| $ZrO_2$ | 16 | 15 | 12 | 13 | 18 | 14 |
| $La_2O_3$ | | | | 3 | | |
| $Nb_2O_5$ | 16 | 17 | 15 | 14.9 | 20 | 19 |
| $Ta_2O_5$ | 3 | 2.5 | 5 | 0.1 | | 3 |
| $WO_3$ | | | | | | |
| $Sb_2O_3$ | 0.2 | | | 0.2 | | 0.2 |
| sum | 100.2 | 100.0 | 100.0 | 100.2 | 100.0 | 100.2 |
| $n_{d\,[7K/h]}$ | 1.6530 | 1.6546 | 1.6673 | 1.6586 | 1.6690 | 1.6539 |
| $\nu_{d\,[7K/h]}$ | 39.8 | 39.4 | 39.4 | 41.3 | 37.1 | 38.5 |
| $P_{g,F\,[7K/h]}$ | 0.5704 | 0.5719 | 0.5714 | 0.5676 | 0.5779 | 0.5734 |
| $\Delta P_{g,F}(10^{-4})_{[7K/h]}$ | −65 | −56 | −62 | −67 | −34 | −57 |
| $\tau_{i(25\,mm;420\,nm)}$ (%) | 94 | 92 | 91 | 93 | 91 | 87 |
| $\alpha_{20-300}$ ($10^{-6}*K^{-1}$) | 7.4 | 8.1 | 9.0 | 8.3 | 6.3 | 7.3 |
| Tg (° C.) | 586 | 600 | 576 | 567 | 583 | 602 |
| $\rho$ (g/cm$^3$) | 3.04 | 3.04 | 3.22 | 3.13 | 3.06 | 3.01 |

TABELLE 3

Melting examples, continued (in % by weight)

| | examples | | | | | |
|---|---|---|---|---|---|---|
| | 7 | 8 | 9 | 10 | 11 | 12 |
| $SiO_2$ | 42 | 45 | 38 | 30 | 38 | 36 |
| $B_2O_3$ | 9 | 8 | 12 | 12 | 11 | 9 |
| $Al_2O_3$ | 2 | | | | | |
| $Na_2O$ | 9.5 | 14 | 10.5 | 11 | 9 | 10 |
| $K_2O$ | 4 | | | | | |
| MgO | | | 3 | | | |
| CaO | 3 | 0.1 | 0.5 | 3 | 7 | 3 |
| BaO | | | | | | |
| SrO | | | | | | |
| ZnO | 0.5 | | 2 | | 0.5 | 1 |
| $ZrO_2$ | 17 | 16 | 15 | 19 | 20 | 10 |
| $La_2O_3$ | | | | | | |
| $Nb_2O_5$ | 13 | 14 | 18 | 16 | 12 | 24 |
| $Ta_2O_5$ | | 2.9 | 1 | 9 | 0.5 | 7 |
| $WO_3$ | | | | | 2 | |
| $Sb_2O_3$ | | 0.2 | | | 0.2 | |
| sum | 100.0 | 100.2 | 100.0 | 100.0 | 100.2 | 100.0 |
| $n_{d\,[7K/h]}$ | 1.6268 | 1.6291 | 1.6509 | 1.6907 | 1.6556 | 1.6876 |
| $\nu_{d\,[7K/h]}$ | 42.6 | 41.2 | 39.5 | 36.8 | 41.9 | 35.0 |
| $P_{g,F\,[7K/h]}$ | 0.5658 | 0.5673 | 0.572 | 0.5758 | 0.565 | 0.5822 |
| $\Sigma P_{g,F}(10^{-4})_{[7K/h]}$ | −64 | −71 | −53 | −61 | −84 | −27 |
| $\tau_{i(25\,mm;420\,nm)}$ (%) | 90 | 92 | 87 | 81 | 87 | 82 |
| $\alpha_{20-300}$ ($10^{-6}*K^{-1}$) | 7.5 | 7.6 | 6.8 | 7.4 | 7.0 | 7.0 |
| Tg (° C.) | 609 | 629 | 585 | 603 | 616 | 596 |
| $\rho$ (g/cm$^3$) | 2.92 | 2.95 | 3.00 | 3.24 | 3.06 | 3.17 |

The invention claimed is:

1. An optical glass having a glass transition temperature of 567° C. to 640° C. and a composition, in percent by weight, comprising:

| | |
|---|---|
| $SiO_2$ | 30-45 |
| $B_2O_3$ | 8-12 |
| $Na_2O$ | 8-15 |
| CaO | 0.1-7 |
| ZnO | $0 \leq 5$ |
| $ZrO_2$ | 10-20 |
| $Nb_2O_5$ | 12-24 |
| $Ta_2O_5$ | $0 \leq 9$ |
| AgO | $0 \leq 5$. |

2. The optical glass according to claim 1, further comprising up to 5% by weight of $K_2O$.

3. The optical glass according to claim 1, further comprising up to 5% by weight $Al_2O_3$ and/or up to 5% by weight of $GeO_2$, but with the proviso that a sum total amount of said $Al_2O_3$ and said $GeO_2$ does not exceed 5% by weight.

4. The optical glass according to claim 1, containing from 0.5 to 5% by weight of said CaO.

5. The optical glass according to claim 1, containing from 0.5 to 4% by weight of said ZnO.

6. The optical glass according to claim 1, further comprising from 0 to 5% by weight of each of MgO, SrO and BaO, with the proviso that a sum total amount of said CaO, said ZnO, said MgO, said SrO and said BaO does not exceed 17% by weight.

7. The optical glass according to claim 1, further comprising from 0 to 7% by weight of $La_2O_3$.

8. The optical glass according to claim 1, containing from 12 to 19% by weight of said $ZrO_2$.

9. The optical glass according to claim 1, containing from 13 to 20% by weight of said $Nb_2O_5$.

10. The optical glass according to claim 1, containing from 0.1 to 7% by weight of said $Ta_2O_5$.

11. The optical glass according to claim 1, containing a sum total amount of $La_2O_3$, said $ZrO_2$, said $Ta_2O_5$ and said $Nb_2O_5$ that does not exceed 45% by weight.

12. The optical glass according to claim 1, further comprising up to 3% by weight of AgO.

13. The optical glass according to claim 1, further comprising at least one component selected from the group consisting of $P_2O_5$, $Y_2O_3$, $Gd_2O_3$, $Yb_2O_5$, $WO_3$ and F, and wherein a sum total amount of said $P_2O_5$, said $Y_2O_3$, said $Gd_2O_3$, said $Yb_2O_5$, said $WO_3$ and said F does not exceed 5% by weight.

14. The optical glass according to claim 1, further comprising at least one refining agent selected from the group consisting of $Sb_2O_3$, SnO, NaCl, $SO_4^{2-}$ and $F^-$, and wherein each of said $Sb_2O_3$, said SnO, said NaCl, said $SO_4^{2-}$ and said $F^-$ that is present in the optical glass is contained in the glass an amount of up to 1% by weight.

15. The optical glass according to claim 1, having a refractive index nd of $1.60 \leq nd \leq 1.72$ and an Abbe number vd of $32 \leq vd \leq 45$.

16. An optical glass having a glass transition temperature (Tg) of 567° C. to 640° C. and a composition, in percent by weight, comprising:

| | |
|---|---|
| $SiO_2$ | 30-45 |
| $B_2O_3$ | 8-12 |
| $\Sigma Al_2O_3 + GeO_2$ | $0 \leq 5$ |
| $Na_2O$ | 8-15 |
| $K_2O$ | $0 \leq 5$ |
| $\Sigma Na_2O + K_2O$ | $8 \leq 18$ |
| CaO | 0.1-7 |
| ZnO | $0 \leq 5$ |
| MgO | $0 \leq 5$ |
| SrO | $0 \leq 5$ |
| BaO | $0 \leq 5$ |
| $\Sigma MgO + CaO + SrO + BaO + ZnO$ | $0.1 \leq 17$ |
| $La_2O_3$ | $0 \leq 7$ |
| $ZrO_2$ | 10-20 |
| $Nb_2O_5$ | 12-24 |
| $Ta_2O_5$ | $0 \leq 9$ |
| $\Sigma La_2O_3 + Nb_2O_5 + Ta_2O_5 + ZrO_2$ | $22 \leq 45$ |
| $\Sigma P_2O_5 + Y_2O_3 + Gd_2O_3 + Yb_2O_5 + WO_3 + F$ | $0 \leq 5$ |
| AgO | $0 \leq 5$. |

17. An optical element made from the glass according to claim 1.

18. The optical element according to claim 17, consisting of a lens, a prism, a light conducting rod, an array, an optical fiber, a gradient component or an optical window.

19. A process for producing an optical element, said process comprising the step of precise pressing the glass according to claim 1.

20. An optical part or optical component for imaging, sensors, microscopy, medical technology, telecommunications, digital projection, optical communications engineering/transmission of information, optics/illumination in the automobile industry, photolithography, steppers, excimer lasers, wafers, computer chips and/or integrated circuits, and electronic devices comprising said chips or said circuits, wherein said optical part or said optical component comprises one or more of said optical elements according to claim 17.

* * * * *